United States Patent
Rao et al.

(10) Patent No.: US 7,480,021 B2
(45) Date of Patent: Jan. 20, 2009

(54) OPTICAL FILMS HAVING REVERSE DISPERSION

(75) Inventors: YuanQiao Rao, Pittsford, NY (US); Douglas R. Robello, Webster, NY (US); Anne M. Miller, Batavia, NY (US)

(73) Assignee: Nitto Denko Corporation, Osaka (JP)

(*) Notice: Subject to any disclaimer, the term of this patent is extended or adjusted under 35 U.S.C. 154(b) by 352 days.

(21) Appl. No.: 11/321,345

(22) Filed: Dec. 29, 2005

(65) Prior Publication Data

US 2007/0153178 A1    Jul. 5, 2007

(51) Int. Cl.
G02F 1/1335    (2006.01)
(52) U.S. Cl. .............. 349/117; 349/118; 349/119; 349/120; 349/121
(58) Field of Classification Search .......... 349/117–121
See application file for complete search history.

(56) References Cited

U.S. PATENT DOCUMENTS

| | | | |
|---|---|---|---|
| 5,853,801 A | 12/1998 | Suga et al. | |
| 6,108,058 A | 8/2000 | Uchida | |
| 6,565,974 B1 * | 5/2003 | Uchiyama et al. | 428/412 |
| 2004/0063887 A1 | 4/2004 | Toyomasu et al. | |
| 2004/0223103 A1 | 11/2004 | Elman | |
| 2004/0227879 A1 | 11/2004 | Elman et al. | |
| 2007/0042137 A1 * | 2/2007 | Rao et al. | 428/1.3 |

FOREIGN PATENT DOCUMENTS

| | | |
|---|---|---|
| EP | 1 387 210 A1 | 2/2004 |
| EP | 1 403 297 A1 | 3/2004 |
| JP | 99095208 | 4/1999 |
| WO | WO 2007/024463 A1 | 3/2007 |

OTHER PUBLICATIONS

International Search Report dated Apr. 5, 2007, issued in corresponding PCT/US2006/046198.

* cited by examiner

*Primary Examiner*—Frank G Font
*Assistant Examiner*—Jerry Blevins
(74) *Attorney, Agent, or Firm*—Westerman, Hattori, Daniels & Adrian, LLP.

(57) ABSTRACT

This invention relates to an optical film comprising a first component having a birefringence dispersion of D1>1 and a second component having a birefringence dispersion of D2<1, wherein the birefringence ratio of the first and second component is delta n1/delta n2>0, wherein the optical film has a reverse birefringence dispersion of D<1.

25 Claims, 9 Drawing Sheets

OPTICAL FILMS HAVING REVERSE DISPERSION

FIELD OF THE INVENTION

The invention relates to an optical film with reverse birefringence dispersion and the methods of making such films. The optical films of the present invention are useful in the field of display and other optical applications.

BACKGROUND OF THE INVENTION

Liquid crystals are widely used for electronic displays. In these display systems, a liquid crystal cell is typically situated between a polarizer and an analyzer. Incident light polarized by the polarizer passes through a liquid crystal cell and is affected by the molecular orientation of the liquid crystal, which can be altered by the application of a voltage across the cell. The altered light goes into the analyzer. By employing this principle, the transmission of light from an external source, including ambient light, can be controlled.

Contrast, color reproduction, and stable gray scale intensities are important quality attributes for electronic displays which employ liquid crystal technology. The primary factor limiting the contrast of a liquid crystal display (LCD) is the propensity for light to "leak" through liquid crystal elements or cells, which are in the dark or "black" pixel state. The contrast of an LCD is also dependent on the angle from which the display screen is viewed. One of the common methods to improve the viewing angle characteristic of LCDs is to use compensation films. Birefringence dispersion is an essential property in many optical components such as compensation films used to improve the liquid crystal display image quality. Even with a compensation film, the dark state can have an undesirable color tint such as red or blue, if the birefringence dispersion of the compensation film is not optimized.

A material that displays at least two different indices of refraction is said to be birefringent. In general, birefringent media are characterized by three indices of refraction, $n_x$, $n_y$, and $n_z$. The out-of-plane birefringence is usually defined by $\Delta n_{th}=n_z-(n_x+n_y)/2$, where $n_x$, $n_y$, and $n_z$ are indices in the x, y, and z direction, respectively. Indices of refraction are functions of wavelength ($\lambda$). Accordingly, out-of-plane birefringence, given by $\Delta n_{th}=n_z-(n_x+n_y)/2$ also depends on $\lambda$. Such a dependence of birefringence on $\lambda$ is typically called birefringence dispersion. The in-plane birefringence is usually defined by $\Delta n_{in}=n_x-n_y$, where $n_x$ and $n_y$ are indices in the x and y direction, respectively. Indices of refraction are functions of wavelength ($\lambda$). Accordingly, in-plane birefringence, given by $\Delta n_{in}=n_x-n_y$ also depends on $\lambda$. Out-of-plane retardation is related to birefringence by $R_{th}=\Delta n_{th} \times d$, where d is the thickness of the optical film and in plane retardation $R_{in}=\Delta n_{in} \times d$.

In several generally used LCD modes, the LCD display suffers deterioration in contrast when the displays are viewed from oblique angles due to the birefringence of liquid crystal and the crossed polarizers. Therefore, optical compensating is needed and retardance film with optimized in-plane and out-of-plane retardation is needed. The use of biaxial films has been suggested to compensate the OCB (U.S. Pat. No. 6,108,058) and VA (JP1999-95208) LCDs.

Figure 1:
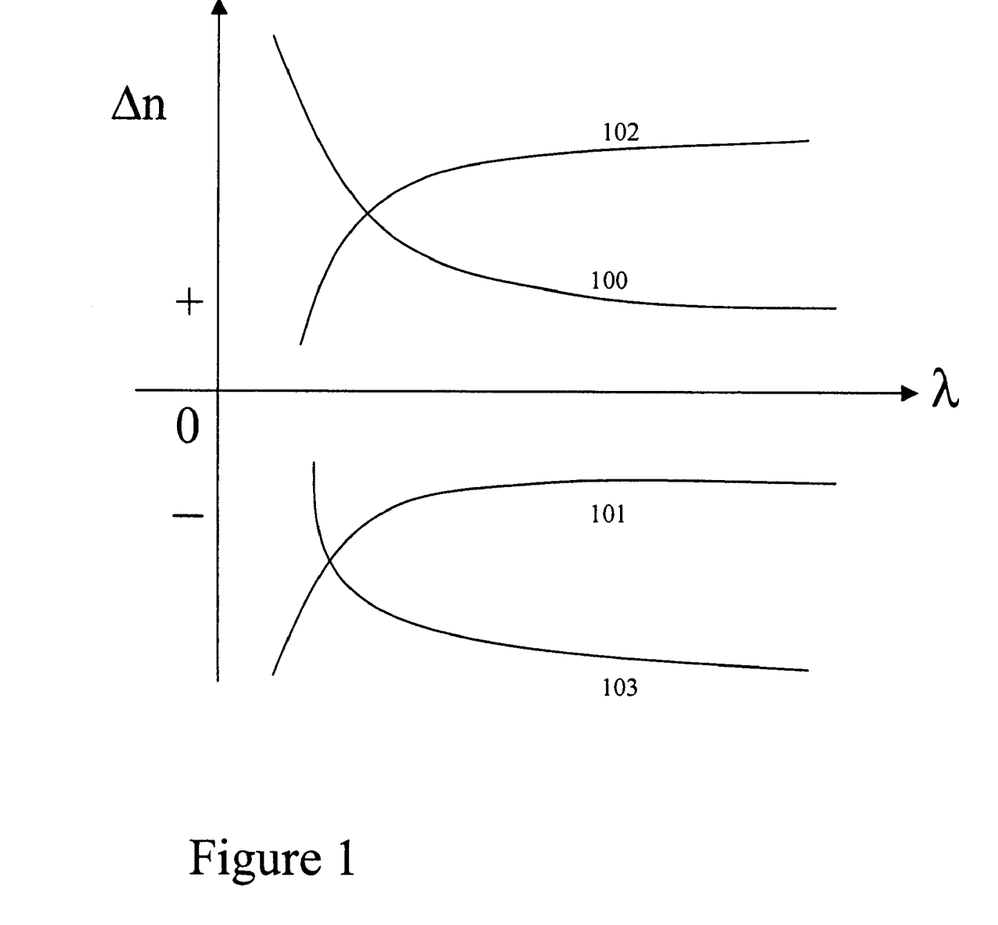
FIG. 1 is a graph showing various birefringence dispersion behaviors, including positive and negative out-of-plane dispersion and reverse dispersion and normal dispersion.

Birefringence dispersion is an essential property in many optical components such as compensation films used to improve the liquid crystal display image quality. Adjusting $\Delta n_{th}$ dispersion, along with in-plane birefringence $\Delta n_{in}$ dispersion, is critical for optimizing the performance of optical components such as compensation films. In most cases, films made by casting polymer have out-of-plane birefringence. Films made by stretching have in-plane birefringence. For simplicity, $\Delta n_{th}$ will be considered hereinafter. The $\Delta n_{th}$ can be negative (101) or positive (100) throughout the wavelength of interest, as shown in FIG. 1. In most cases, film made by casting polymer having a positive intrinsic birefringence, $\Delta n_{int}$, gives negative $\Delta n_{th}$. Its dispersion is such that the $\Delta n_{th}$ value becomes less negative at longer wavelength (101). On the other hand, by casting polymer with negative $\Delta n_{int}$, one obtains a positive $\Delta n_{th}$ value with less positive $\Delta n_{th}$ value at longer wavelength (100). The dispersion behavior, in which the absolute value of $\Delta n_{th}$ decreases with increasing wavelength, is called "normal" dispersion.

In contrast to normal dispersion, it is often desirable to have the absolute value of $\Delta n_{th}$ increase with increasing wavelength, which is called "reverse" dispersion (reverse dispersion curves 102 and 103 in FIG. 1). Hereinafter, dispersion constant is defined as $$D=\Delta n(450 \text{ nm})/\Delta n(590 \text{ nm})$$

Thus, the optical component has a reverse dispersion when $$D<1$$

These cases of different behaviors in $\Delta n_{th}$ in principle can be achieved by suitable combination of two or more layers having difference dispersion in $\Delta n_{th}$. Such an approach, however, is difficult, as one has to carefully adjust the thickness of each layer. Also, extra process steps are added to manufacturing.

Figure 2:
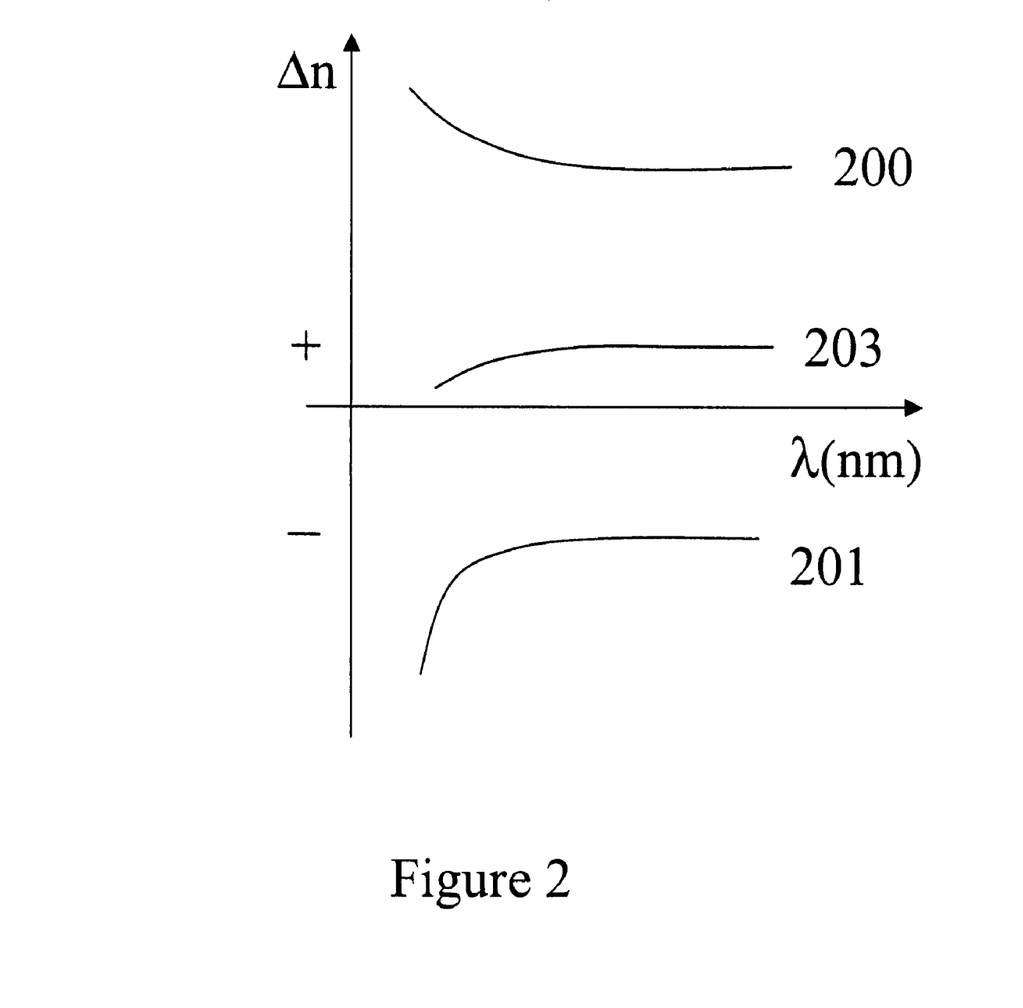
FIG. 2 is a graph showing a reverse dispersion copolymer comprising positive and negative out-of-plane birefringence exhibiting normal dispersion.

U.S. Pat. No. 6,565,974 discloses controlling birefringence dispersion by means of balancing the optical anisotropy of the main chain and side chain chromophore group of a polycarbonate. Both chromophores in the main chain and side chain have normal dispersion but are arranged in a perpendicular orientation and thus have different signs of birefringence, a positive dispersive segment 200 and a negative dispersive segment 201. The combination of them can be finely tuned. This method enables the generation of a polymer having smaller birefringence (or equivalent retardation value) at shorter wavelength, a reverse dispersion copolymer (203) according to the schematics of FIG. 2. However, the incorporation of two balancing chromophores makes the final material less birefringent. Thus, thick films are needed to achieve adequate retardation.

PROBLEM TO BE SOLVED BY THE INVENTION

The problem to be solved is to develop a material with reverse birefringence dispersion. It is desirable to develop a material with reverse birefringence dispersion comprising a component having inherent reverse dispersion. It is especially desirable to be able to easily make such materials into films that can be used as compensation films for display devices, particularly LCDs.

SUMMARY OF THE INVENTION

This invention provides an optical film comprising a first component having a birefringence dispersion of $D_1>1$ and a second component having a birefringence dispersion of $D_2<1$, wherein the birefringence ratio of the first and second component is $\Delta n1/\Delta n2>0$, wherein the optical film has a reverse birefringence dispersion of $D<1$. In one embodiment the optical film comprises a component having a maximum peak absorption at a wavelength greater than 700 nm. The invention further provides an LCD polarizer film composite comprising a polarizer and an optical film comprising a first component having a birefringence dispersion of D1>1 and a second component having a birefringence dispersion of D2<1, wherein the birefringence ratio of the first and second component is delta n1/delta n2>0, wherein the optical film has a reverse birefringence dispersion. The invention also provides a method of making an optical film comprising mixing a first component having a birefringence dispersion of D1>1 and a second component having a birefringence dispersion of D2<1 and forming an optical film from the resulting mixture, wherein the birefringence ratio of the first and second component is delta n1/delta n2>0, and wherein the optical film has a reverse birefringence dispersion Such optical materials are useful for obtaining reverse dispersion behavior in an optical film.

BRIEF DESCRIPTION OF THE DRAWINGS

The embodiments are best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION OF THE INVENTION

The invention has been described with reference to preferred embodiments. However, it will be appreciated that variations/modifications of such embodiments can be affected by a person of ordinary skill in the art without departing from the scope of the invention.

As mentioned above, the present invention provides a new material and method for forming materials having desired out-of-plane birefringence ($\Delta n_{th}$) behavior. The invention further provides a method of processing such materials to produce a coating, free-standing film, or article having the desired $\Delta n_{th}$ dispersion behavior. The invention can be used to form a flexible film that has high optical transmittance or transparency and low haze. These and other advantages will be apparent from the detailed description below.

Figure 3:
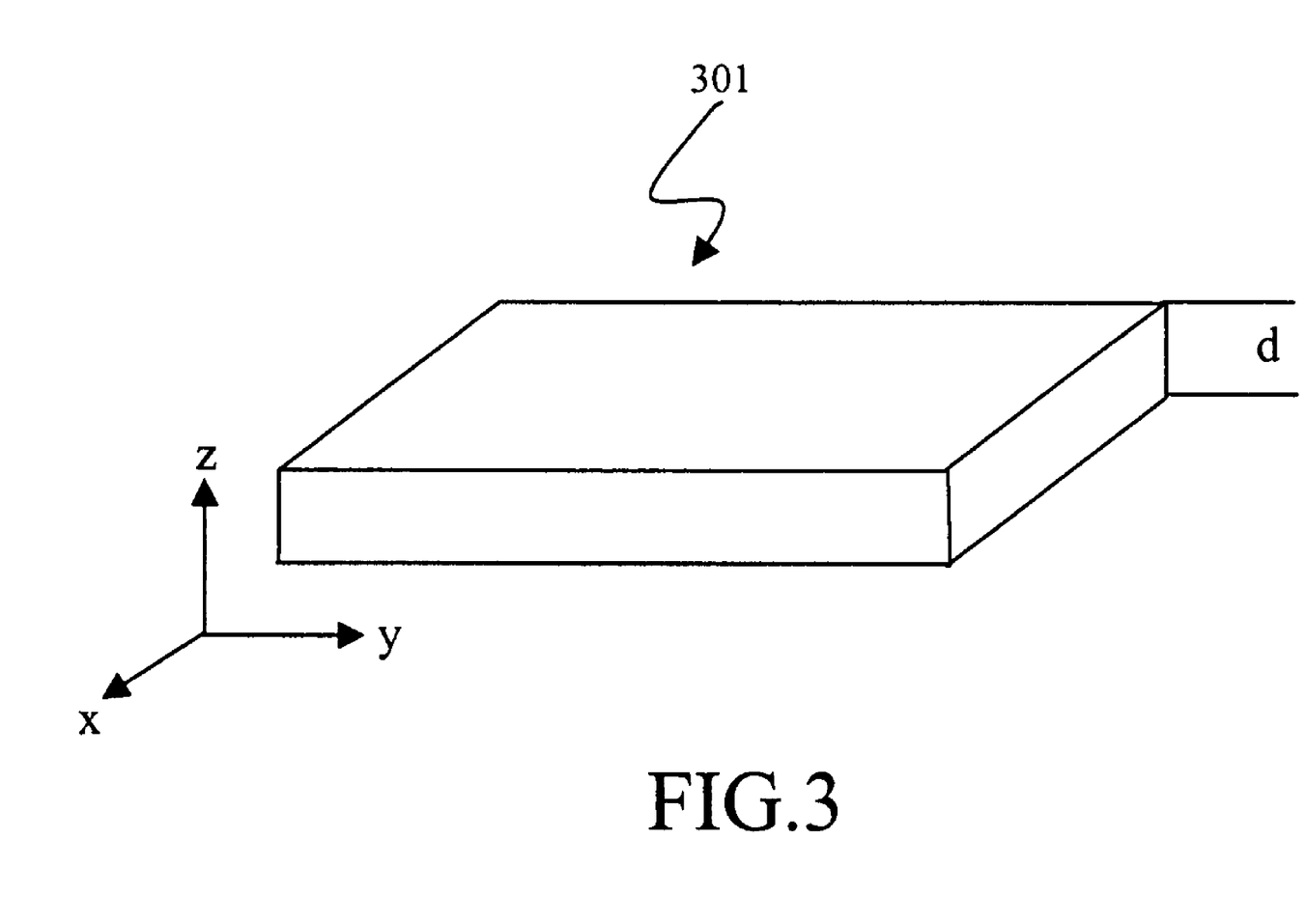
FIG. 3 illustrates an exemplary film having a thickness d and dimensions in the "x", "y," and "z" directions in which x and y lie perpendicularly to each other in the plane of the film, and z is normal the plane of the film.

With reference to FIG. 3, the following definitions apply to the description herein:

The letters "x", "y," and "z" define directions relative to a given film (301), where x and y lie perpendicularly to each other in the plane of the film, and z is normal the plane of the film.

The term "optic axis" refers to the direction in which propagating light does not see birefringence. In polymer material, the optic axis is parallel to the polymer chain.

The terms "$n_x$," "$n_y$," and "$n_z$" are the indices of refraction of a film in the x, y, and z directions, respectively.

A "C-plate" refers to a plate or a film in which $n_x=n_y$, and $n_z$ differs from $n_x$ and $n_y$. Usually, when materials are cast into a film, the film possesses the property of a C-plate.

The term "intrinsic birefringence ($\Delta n_{int}$)" with respect to a polymer or mineral refers to the quantity defined by $(n_e-n_o)$, where $n_e$ and $n_o$ are the extraordinary and ordinary index of the polymer or mineral, respectively. Intrinsic birefringence of a polymer is determined by factors such as the polarizabilities of functional groups and their bond angles with respect to the polymer chain. Indices of refraction $n_x$, $n_y$, and $n_z$ of a polymer article, such as a film, are dependent upon manufacturing process conditions of the article and $\Delta n_{int}$ of the polymer. $n_x$, $n_y$, and $n_z$ are conveniently defined according to the coordinates of the film, i.e, $n_x$, $n_y$, are two in-plane indexes and $n_z$ is the out of plane index as shown in FIG. 3.

The term "out-of-plane phase retardation ($R_{th}$)" of a film is a quantity defined by $[n_z-(n_x+n_y)/2]d$, where d is the thickness of the film 301 as shown in FIG. 3. The quantity $[n_z-(n_x+n_y)/2]$ is referred to as the "out-of-plane birefringence ($\Delta n_{th}$)".

The term "in-plane birefringence" with respect to a film 301 is defined by $|n_x-n_y|$.

The birefringence is a quantity dependent on the wavelength of the light. This dependence to the wavelength of light is called the dispersion. The term "D" is defined as the ratio of the birefringence at wavelength 450 nm to the birefringence at 590 nm: $D=\Delta n_{th}(450\ nm)/\Delta n_{th}(590\ nm)$.

The optical film of this invention comprises a first component that has a birefringence dispersion of $D_1>1$, and preferably a birefringence dispersion wherein $D_1<1.05$. The second component has a birefringence dispersion of $D_2<1$, and preferably a birefringence dispersion of $D_2<0.9$. A birefringence dispersion of D=1 is that the birefringence of the optical element is a constant and does not change with the wavelength. A first component having a birefringence dispersion of $D_1>1$ means a component having a normal birefringence dispersion. A second component having a birefringence dispersion of $D_2<1$ means a component having a reverse birefringence dispersion. When the birefringence ratio of the first and second component is $\Delta n1/\Delta n2>0$, it means the two components have the same sign of birefringence, either both positive or both negative. The resulting optical film must have a reverse birefringence dispersion of D<1. Preferably the optical film has a reverse birefringence dispersion of D<0.9.

It is preferred that the first component be a polymer. As noted above, for a polymeric material, the indices $n_x$, $n_y$, and $n_z$ result from the $\Delta n i_{int}$ of the material and the process of forming the film. Various processes, e.g., casting, stretching and annealing, give different states of polymer chain alignment. This, in combination with $\Delta n_{int}$, determines $n_x$, $n_y$, $n_z$. Generally, solvent-cast polymer film exhibits small in-plane birefringence ($<10^{-4}$ to $10^{-5}$ at $\lambda=550$ nm). Depending on the processing conditions and the kind of polymer, however, $\Delta n_{th}$ can be larger.

Figure 4:
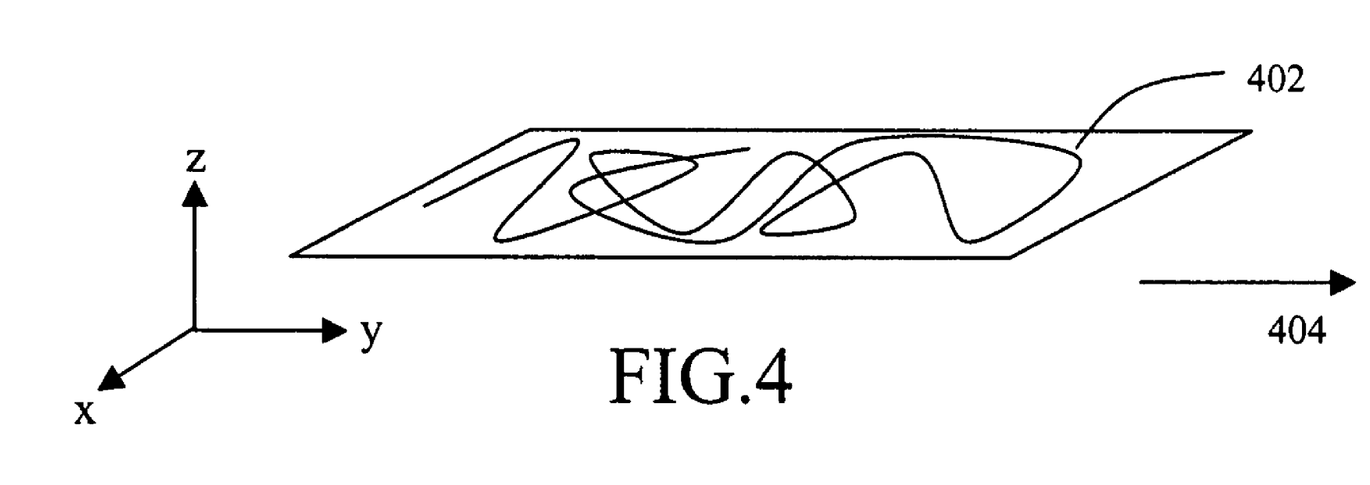
FIG. 4 shows a polymeric film in which the polymer chains have a statistically averaged alignment direction.

The mechanism of generating $\Delta n_{th}$ can be explained by using the concept of the order parameter, S. As is well known to those skilled in the art, the out-of-plane birefringence of the polymer film is given by $\Delta n_{th}=S\Delta n_{int}$. As mentioned above, $\Delta n_{int}$ is determined only by the properties of the polymer, whereas the process of forming the film fundamentally controls S. S is usually positive and $S\leq 1$, if the polymer chains (402) in a polymeric film have a statistically averaged alignment direction (404), as shown in FIG. 4. In order to obtain negative $\Delta n_{th}$, a polymer having positive $\Delta n_{int}$ is used, while for positive $\Delta n_{th}$, ones with negative $\Delta n_{int}$ is employed. In both cases, one has the property of a C-plate having nx=ny.

Figure 5:
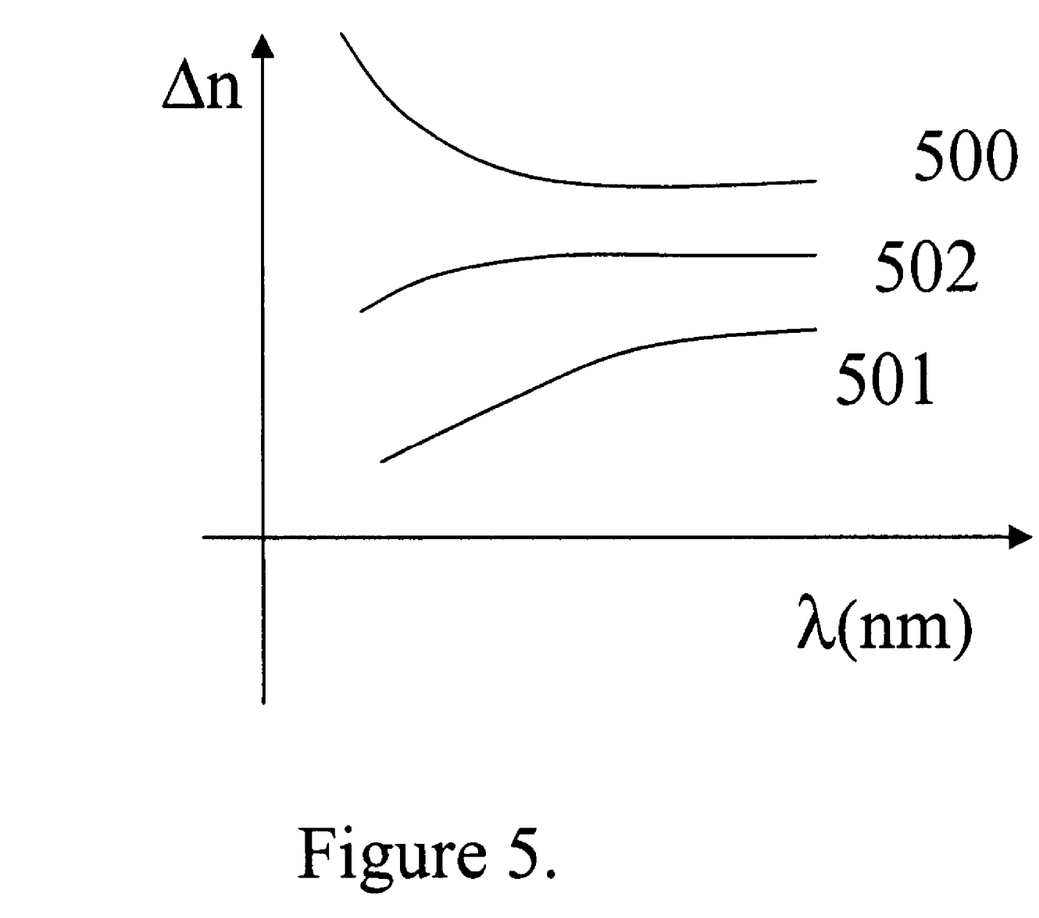
FIG. 5 is a schematic of the inventive material comprising two components.

The $\Delta n_{int}$ dispersion behavior of most of polymer materials is normal, that is, the absolute values of birefringence decreases at longer λ as normal dispersion curves 100 and 101 in FIG. 1. This also gives normal dispersion behavior in Δnth. In accordance with the present invention, the dispersion behavior of a film is controlled by an optical material having two components, wherein one of the components has reverse birefringence dispersion. A reverse birefringence dispersion material can be formed by having two components and arranging their relative orientation such that their individual birefringence dispersions behave as normal polymer 500 and reverse dispersive additive 501 in FIG. 5 and the final material has a reverse birefringence dispersion like final material 502. For the purpose of illustration, only a positive birefringence material is plotted. The negative birefringence material can be formed according to the same method.

It is preferred that the polymer be transparent in the visible range. In general a preferred polymer is a vinyl polymer or a condensation polymer.

The term "chromophore" is defined as an atom or group of atoms that serve as a unit in light adsorption. (*Modem Molecular Photochemistry*, Nicholas J. Turro, Ed., Benjamin/Cummings Publishing Co., Menlo Park, Calif. (1978), pg 77.)

Typical chromophore groups for use in the polymers used in the present invention include vinyl, carbonyl, amide, imide, ester, carbonate, aromatic (i.e., heteroaromatic or carbocylic aromatic such as phenyl, naphthyl, biphenyl, thiophene, bisphenol), sulfone, and azo or combinations of these chromophores. A non-visible chromophore is one that has an absorption maximum outside the range of λ=400-700 nm.

The relative orientation of the chromophore to the optical axis of a polymer chain determines the sign of $\Delta n_{int}$. If placed in the main chain, the $\Delta n_{int}$ of the polymer will be positive and, if the chrompophore is placed in the side chain, the $\Delta n_{int}$ of the polymer will be negative.

Examples of negative $\Delta n_{int}$ polymers include materials having non-visible chromophores off of the polymer backbone. Such non-visible chromophores, for example, include: vinyl, carbonyl, amide, imide, ester, carbonate, sulfone, azo, and aromatic heterocyclic and carbocyclic groups (e.g., phenyl, naphthyl, biphenyl, terphenyl, phenol, bisphenol A, and thiophene). In addition, combinations of these non-visible chromophores may be desirable (i.e., in copolymers). Examples of such polymers and their structures are poly (methyl methacrylate), poly(4 vinylbiphenyl) (Formula I below), poly(4 vinylphenol) (Formula II), poly(N-vinylcarbazole) (Formula III), poly(methylcarboxyphenylmethacrylamide) (Formula IV), polystyrene, poly[(1-acetylindazol-3-ylcarbonyloxy)ethylene](Formula V), poly (phthalimidoethylene) (Formula VI), poly(4-(1-hydroxy-1-methylpropyl)styrene) (Formula VII), poly(2-hydroxymethylstyrene) (Formula VIII), poly(2-dimethylaminocarbonylstyrene) (Formula IX), poly(2-phenylaminocarbonylstyrene) (Formula X), poly(3-(4-biphenylyl)styrene) (XI), and poly(4-(4-biphenylyl)styrene) (XII), -continued carbonyl, amide, imide, ester, carbonate, sulfone, azo, and aromatic heterocyclic and carbocyclic groups (e.g., phenyl, naphthyl, biphenyl, terphenyl, phenol, bisphenol A, and thiophene). In addition, polymers having combinations of these non-visible chromophores may be desirable (i.e., in copolymers). Examples of such polymers are polyesters, polycarbonates, polysulfones, polyketones, polyamides, and polyimides containing the following monomers:

Examples of positive $\Delta n_{int}$ polymers include materials that have non-visible chromophores on the polymer backbone. Such non-visible chromophores, for example, include: vinyl, -continued 2,2-bis(4-hydroxy-phenyl) propane The following Table 1 lists various values for intrinsic birefringence $\Delta n_{int}$ for typical polymers used in optical films:

TABLE 1

| | |
|---|---|
| Polystyrene | $\Delta n_{int} = -0.100$ |
| Polyphenylene oxide | $\Delta n_{int} = +0.210$ |
| Bisphenol A Polycarbonate | $\Delta n_{int} = +0.106$ |
| Polymethyl methacrylate | $\Delta n_{int} = -0.0043$ |
| Polyethylene terephthalate | $\Delta n_{int} = +0.105$ |

As evident by the $\Delta n_{int}$ value, acrylic polymers, for example polymethylmethacrylate (PMMA), and poly(vinylcarbazole) are preferred for obtaining positive reverse birefringence according to the present invention. A preferred polymer for obtaining negative reverse dispersion is a positive $\Delta n_{int}$ polymer such as polyetherimide and polycarbonate.

The second component may be any compound that meets the parameters discussed above. Preferably the second component has a maximum peak absorption at a wavelength greater than 700 nm and does not absorb in the visible range, such as an IR-ray absorbing or IR dye. While the second component may be a polymer it is preferred that the second component has a molecular weight of less than 2000. In one embodiment the second component is an organic component. In another embodiment the second component may be covalently attached to the polymer.

Figure 6:
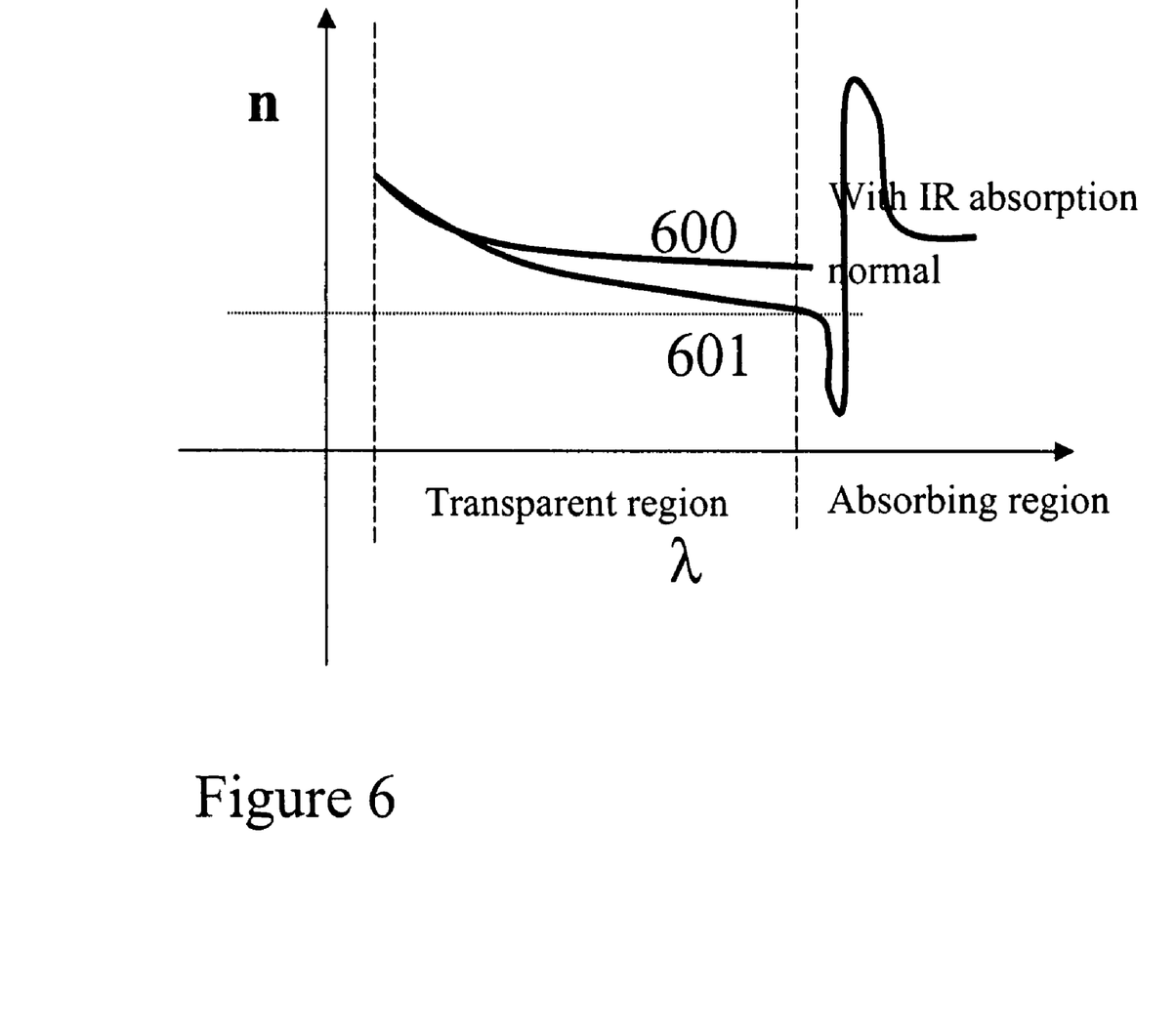
FIG. 6 is a schematic of the effect of optical residue.

Optical residues are known in optical physics. (ref. 1. Wooten, Optical Properties of Solids, Academic Press, 1972). This reference describes that the lower energy absorption peaks decrease n at lower energies even in transparent spectral regions as shown in FIG. 6. For a typical material possessing a refractive index behavior as in normal curve 600, the index behavior changes to IR absorption curve 601 when an absorbing chromophore presents. It is noticeable that when the absorbing maximum peak is above 700 nm (IR absorbing), the material is transparent in the visible range (350 nm to 650 nm). It is further noticeable that the refractive index decreases more with the increasing wavelength and its dispersion is increased with the presence of the IR absorbing group.

Figure 7:
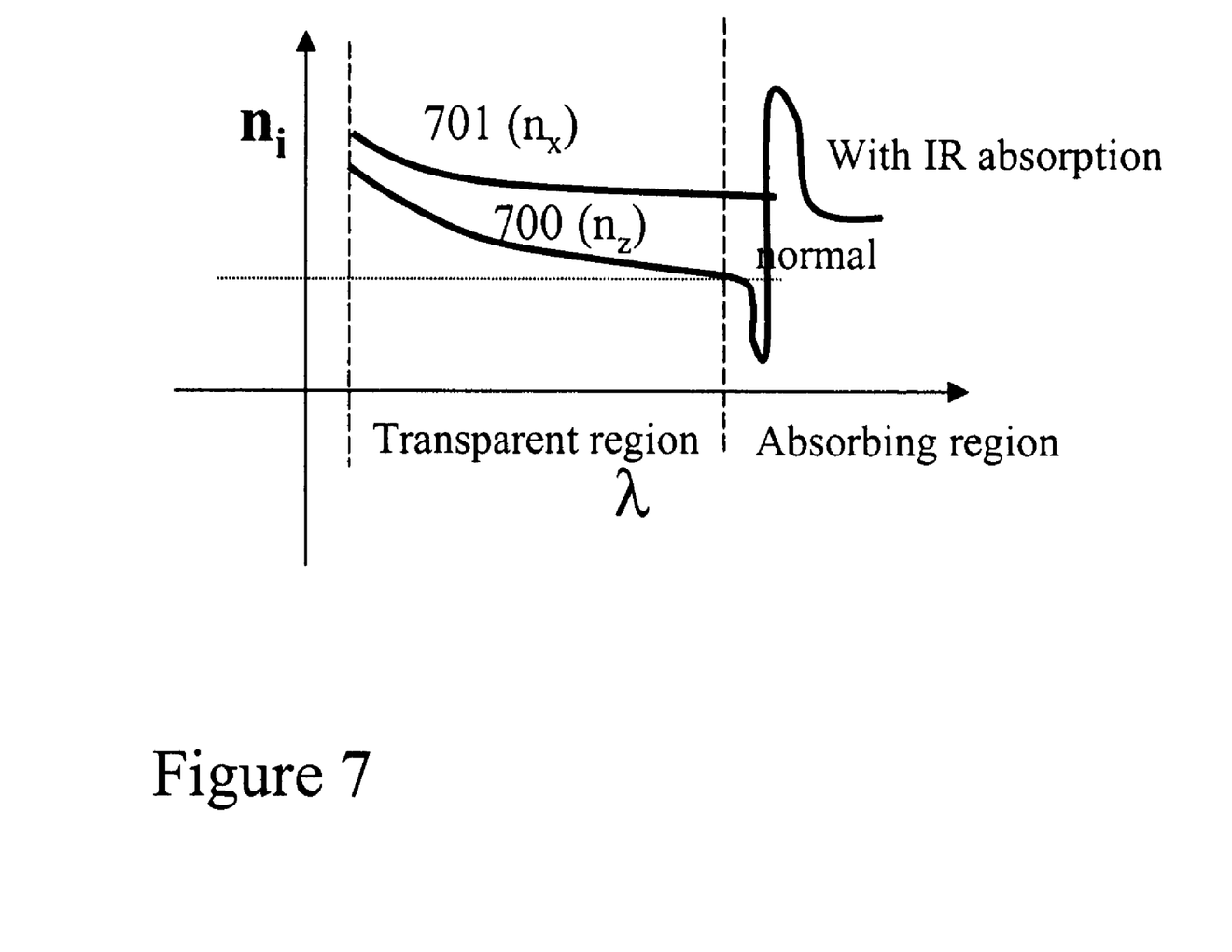
FIG. 7 is a schematic of the different refractive indecies in an IR absorbing group.
Figure 8:
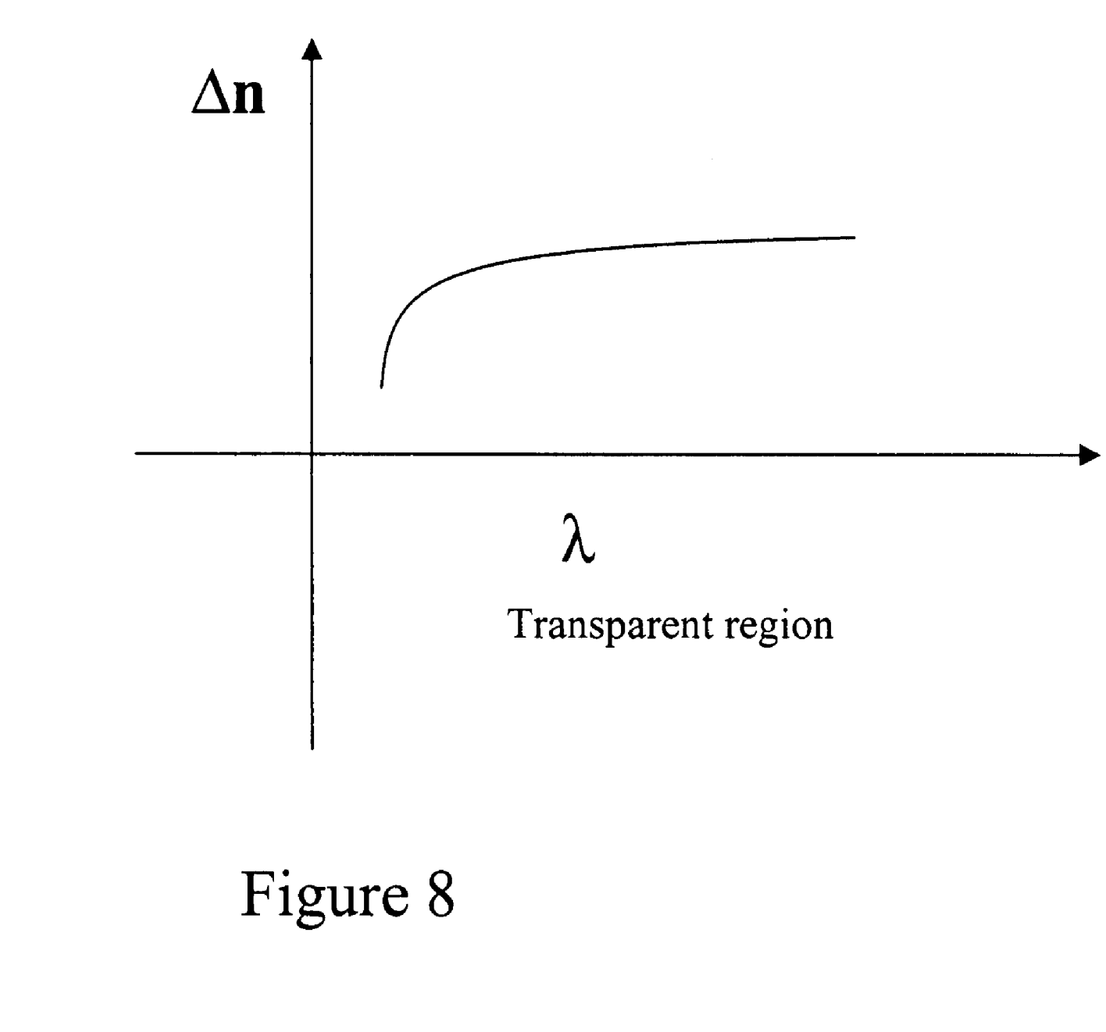
FIG. 8 is a schematic of an IR absorbing group with reverse dispersion.

It is often known that IR absorbing groups often behave dichroic, in which the absorbing is anisotropic (ref. 2. A V Ivashchenko Dichroic Dyes for Liquid Crystal Displays CRC Press) Therefore, its optical residue effect will be also anisotropic. The effect is shown in FIG. 7 that the nx material, curve (701), has higher refractive index and lower refractive index dispersion, while the nz material, curve (700), has lower refractive index and higher refractive index dispersion. The birefringence formed is then positive birefringence with reverse dispersion as shown in FIG. 8.

The infrared ray-absorbing dyes favorably used in the invention include commercially available dyes and publicly known dyes described in literature. Specific examples thereof include azo dyes, metal complex salt azo dyes, pyrazolone azo dyes, anthraquinone dyes, phthalocyanine dyes, carbonium dyes, quinonimine dyes, methine dyes, cyanine dyes and the like. Typical examples of these infrared ray-absorbing dyes include cyanine dyes described in JP-A Nos. 58-125246, 59-84356, 59-202829 and 60-78787; methine dyes described in JP-A Nos. 58-173696, 58-181690, and 58-194595, and others; naphthoquinone dyes described in JP-A Nos. 58-112793, 58-224793, 59-48187, 59-73996, 60-52940, and 60-63744, and others; squarylium dyes described in JP-A No. 58-112792 and others; cyanine dye described in U.K. Patent No. 434,875; and the like.

Particularly preferable among these dyes are cyanine dyes. A general formula of cyanine dye is shown below:

wherein a1 and b1 vary from 0 to 5; W1 and X1 may be the same or different and are selected from the group consisting of $-CR^{10}R^{11}$, $-O-$, $-NR^{12}$, $-S-$, and $-Se-$; $Q^1$ is a single bond or is selected from the group consisting of $-O-$, $-S-$, $-Se-$, and $-NR^{13}$; $Y^1$ and $Z^1$ may be the same or different and are selected from the group consisting of $-(CH_2)_c-CO_2H$, $-CH_2-(CH_2-O-CH_2)_d-CH_2-CO_2H$, $-(CH_2)_e-NH_2$, $-CH_2-(CH_2-O-CH_2)_f-CH_2-NH_2$, $-(CH_2)_g-N(R_{14})-(CH_2)_h-CO_2H$, and $-(CH_2)_i-N(R_{15})-CH_2-(CH_2-O-CH_2)_j-CH_2-CO_2H$; $R^1$ and $R^{10}$ to $R^{15}$ may be same or different and are selected from the group consisting of -hydrogen, C1-C10 alkyl, C1-C10 aryl, C1-C10 alkoxyl, C1-C10 polyalkoxyalkyl, $-CH_2(CH_2-O-CH_2)_c-CH_2-OH$, C1-C20 polyhydroxyalkyl, C1-C10 polyhydroxyaryl, $-(CH_2)_d-CO_2H$, $-CH_2-(CH_2-O-CH_2)_e-CH_2-CO_2H$, $-(CH_2)_f-NH_2$, and $-CH_2-(CH_2-O-CH_2)_g-CH_2-NH_2$; c, e, g, h, and i vary from 1 to 10; d, f and j vary from 1 to 100; and $R^2$ to $R^9$ may be the same or different and are selected from the group consisting of hydrogen, C1-C10 alkyl, C1-C10 aryl, hydroxyl, C1-C10 polyhydroxyalkyl, C1-C10 alkoxyl, amino, C1-C10 aminoalkyl, cyano, nitro and halogen.

Examples of suitable dyes include, but are not limited to the following:

-continued

New optical materials can be made having component 1, the polymer, and component 2, the IR absorbing group. The methods of synthesizing the materials include mixing (IR absorbing compound doping), forming associating species through electrostatic interaction, and covalently attaching the IR absorbing group to the polymer chain. These various methods are known to those skilled in the art.

By suitable selection of the polymer and IR absorbing group, the birefringence dispersion can be controlled to obtain an optical film exhibiting reverse dispersion and simultaneously satisfying the following two conditions:

$|\Delta n_{th}(\lambda_2)| - |\Delta n_{th}(\lambda_1)| > 0$ for 400 nm $< \lambda_1 < \lambda_2 <$ 650 nm  (i)

$\Delta n_{th}(400\ nm)/\Delta n_{th}(590\ nm) < 0.98$, preferably 0.95 and more preferably 0.9  (ii)

In one suitable embodiment the optical film is a compensation or a retardance film. Such films may be formed by preparing a mixture of the first and second components and either coating or casting the film using methods know to those skilled in the art. Preferably the in-plane retardation of the film is from 0 to 300 nm, more preferably the in-plane retardation of the film is from 20 to 200 nm, and most preferably the in-plane retardation of the film is from 25 to 100 nm. Also preferably the out-of-plane retardation of the film is from −300 to +300 nm, more preferably out-of-plane retardation of the film is from −200 to +200 nm, and most preferably the out-of-plane retardation of the film is from −100 to +100 nm.

One of the major factors measuring the quality of LCDs is the viewing angle characteristic, which describes a change in contrast ratio from different viewing angles. It is desirable to be able to see the same image from a wide variation in viewing angles and this ability has been a shortcoming with liquid crystal display devices. One way to improve the viewing angle characteristic is to employ a viewing angle compensation film (also referred to as a compensation layer, retarder layer, or phase difference layer), with proper optical properties, between the Dichroic PVA film and liquid crystal cell, such as disclosed in U.S. Pat. Nos. 5,583,679; 5,853,801; 5,619,352; 5,978,055; and 6,160,597. A compensation film according to U.S. Pat. Nos. 5,583,679 and 5,853,801 based on discotic liquid crystals which have negative birefringence, is widely used.

Viewing angle compensation films used in the present invention are optically anisotropic layers. The optically anisotropic, viewing angle compensation layers may comprise positively birefringent materials or negatively birefringent materials. The compensation layer may be optically uniaxial or optically biaxial. The compensation layer may have its optic axis tilted in the plane perpendicular to the layer. The tilt of the optic axis may be constant in the layer thickness direction or the tilt of the optic axis may vary in the layer thickness direction.

Optically anisotropic, viewing angle compensation layers may comprise the negatively birefringent, discotic liquid crystals described in U.S. Pat. Nos. 5,583,679 and 5,853,801; the positively birefringent nematic liquid crystals described in U.S. Pat. No. 6,160,597; the negatively birefringent amorphous polymers described in commonly assigned U.S. Patent Application Publication 2004/0021814A and U.S. patent application Ser. No. 10/745,109, filed Dec. 23, 2003. These latter two patent applications describe compensation layers comprising polymers that contain non-visible chromophore groups such as vinyl, carbonyl, amide, imide, ester, carbonate, sulfone, azo, and aromatic groups (i.e. benzene, naphthalate, biphenyl, bisphenol A) in the polymer backbone and that preferably have a glass transition temperature of greater than 180 degree C. Such polymers are particularly useful in the compensation layer of the present invention. Such polymers include polyesters, polycarbonates, polyimides, polyetherimides, and polythiophenes. Of these, particularly preferred polymers for use in the present invention include: (1) a poly(4,4'-hexafluoroisopropylidene-bisphenol)terephthalate-co-isophthalate; (2) a poly(4,4'-hexahydro-4,7-methanoindan-5-ylidenebisphenol)terephthalate; (3) a poly(4,4'-isopropylidene-2,2'6,6'-tetrachlorobisphenol)terephthalate-co-isophthalate; (4) a poly(4,4'-hexafluoroisopropylidene)-bisphenol-co-(2-norbomylidene)-bisphenol terephthalate; (5) a poly(4,4'-hexahydro-4,7-methanoindan-5-ylidene)-bisphenol-co-(4,4'-isopropylidene-2,2',6,6'-tetrabromo)-bisphenol terephthalate; (6) a poly(4,4'-isopropylidene-bisphenol-co-4,4'-(2-norbomylidene)bisphenol) terephthalate-co-isophthalate; (7) a poly(4,4'-hexafluoroisopropylidene-bisphenol-co-4,4'-(2-norbomylidene)bisphenol)terephthalate-co-isophthalate; or (8) copolymers of any two or more of the foregoing

Another optional compensation layer suitable cover sheets used in the present invention includes an optically anisotropic layer comprising an exfoliated inorganic clay material in a polymeric binder as described in Japanese Patent Application 11095208A The following examples illustrate the practice of this invention. They are not intended to be exhaustive of all possible variations of the invention. Parts and percentages are by weight unless otherwise indicated. All birefringence and retardation values are at 590 nm unless otherwise stated.

EXAMPLES

In the following experiments, the out-of-plane birefringence $\Delta n_{th}$ and transmittance were measured using a Woollam® M-2000V Variable Angle Spectroscopic Ellipsometer.

IR absorbing material

IR dye -1

IR dye -2

The term "D" is defined as follows as the ratio of the birefringence at wavelength 450 nm to the birefringence at 590 nm: $D=\Delta n_{th}(450\ nm)/\Delta n_{th}(590\ nm)$.

The exemplary compositions of 1 to 6 as shown in Table 2 were mixed together in a solvent of dichlromethane. The solution was then spin coated on a glass plate to generate a coating of 500 nm.

TABLE 2

| | PMMA wt % | IR dye-1 wt % | IR dye-2 wt % | dispersion Rth(450)/ Rth(590) |
|---|---|---|---|---|
| Example-1 | 95 | 5 | | 0.42 |
| Example-2 | 95 | | 5 | 0.68 |
| Example-3 | 95 | | 5 | 0.75 |
| Example-4 | 95 | | 5 | 0.78 |
| Example-5 | 90 | 10 | | 0.78 |
| Example-6 | 90 | | 10 | 0.78 |
| comparative Example | 100 | | | 1.01 |

Figure 9:
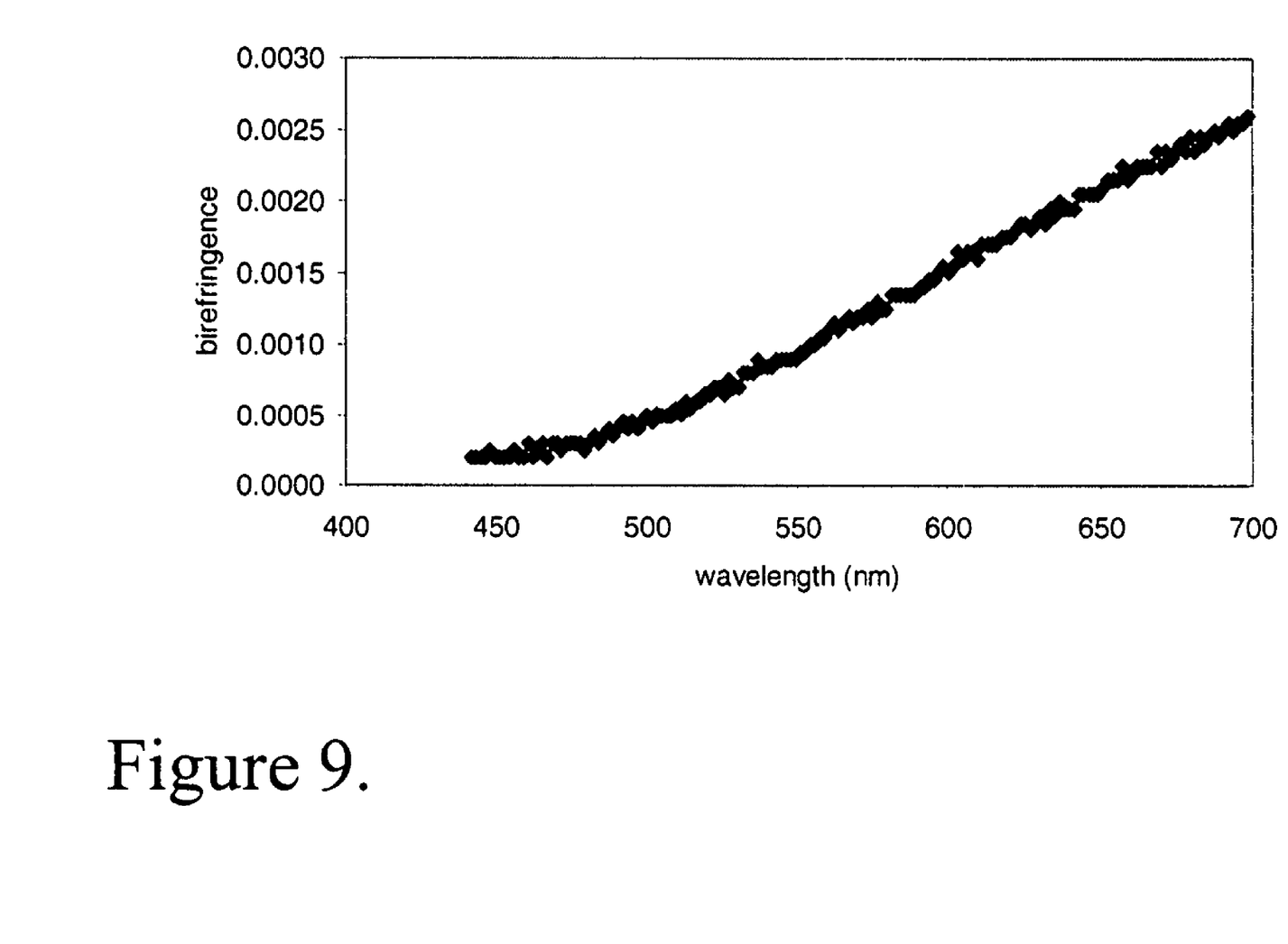
FIG. 9 is a birefringence spectrum of Example 7.

Based on the results shown in Table 2, Example 1 to Example 6 show a reverse birefringence dispersion in that $D\Delta n_{th}<1$, while the comparative example has a normal birefringence dispersion of $D\Delta n_{th}>1$. The birefringence spectrum of Example 1 is shown in FIG. 9 and has a reverse birefringence.

A thicker coating of 20 microns was also made from 95% PMMA and 5% IR dye-1 (Example 7) and from 90% PMMA and 10% IR dye-1 using a doctor blade (Example 8). Its retardation and dispersion number is listed in Table 3.

TABLE 3

| | PMMA % | IR dye-1 % | Retardation nm | dispersion Rth(450)/Rth(590) |
|---|---|---|---|---|
| Example-7 | 95 | 5 | 17 | 0.58 |
| Example-8 | 90 | 10 | 51 | 0.45 |

Table 3 shows that the optical film made from the mixture of PMMA and IR dye-1 has good retardation and reverse birefringence dispersion.

The invention has been described in detail with particular reference to certain preferred embodiments thereof, but it will be understood that variations and modifications can be effected within the spirit and scope of the invention.

| PARTS LIST | |
|---|---|
| 100 | normal dispersion curve |
| 101 | normal dispersion curve |
| 102 | reverse dispersion curve |
| 103 | reverse dispersion curve |
| 200 | positive dispersive segment |
| 201 | negative dispersive segment. |
| 203 | reverse dispersion copolymer |
| 301 | film |
| 402 | polymer chains |
| 404 | statistically averaged alignment direction |
| 500 | normal polymer |
| 501 | reverse dispersive additive |
| 502 | final material |
| 600 | normal curve |
| 601 | IR absorption curve |
| 700 | nz material, curve |
| 701 | nx material |

The invention claimed is:

1. An optical film comprising a first component having a birefringence dispersion of D1>1 and a second component having a birefringence dispersion of D2<1, wherein the birefringence ratio of the first and second component is delta n1/delta n2>0, and wherein the optical film has a reverse birefringence dispersion of D<1.

2. The optical film of claim 1 wherein the optical film has a reverse birefringence dispersion of D<0.98.

3. The optical film of claim 1 wherein the first component is a polymer.

4. The optical film of claim 3 wherein the second component has a maximum peak absorption at a wavelength greater than 700 nm.

5. The optical film of claim 4 wherein the second component has a molecular weight of less than 2000.

6. The optical film of claim 5 wherein the second component is an organic component.

7. The optical film of claim 6, wherein the organic component is an IR-ray absorbing or IR dye.

8. The optical film of claim 3 wherein the second component is covalently attached to the polymer.

9. The optical film of claim 8 wherein the second component has a maximum peak absorption at a wavelength greater than 700 nm.

10. The optical film of claim 3 wherein the polymer is transparent in the visible range.

11. The optical film of claim 3 wherein the polymer is a vinyl polymer or a condensation polymer.

12. The optical film of claim 3 wherein the polymer is polymethylmethacrylate.

13. The optical film of claim 1 wherein the first component has a birefringence dispersion of D1<1.05.

14. The optical film of claim 1 wherein the second component has a birefringence dispersion of D2<0.9.

15. The optical film of claim 1, wherein said film is a retardance film.

16. The optical film of claim 1 wherein the in-plane retardation of 20 the film is from 0 to 300 nm.

17. The optical film of claim 1 wherein the in-plane retardation of the film is from 20 to 200 nm.

18. The optical film of claim 1 wherein the in-plane retardation of the film is from 25 to 100 nm.

19. The optical film of claim 1 wherein the out-of-plane retardation of the film is from −300 to +300 nm.

20. The optical film of claim 1 wherein the out-of-plane retardation of the film is from −200 to +200 nm.

21. The optical film of claim 1 wherein the out-of-plane 5 retardation of the film is from −100 to +100 nm.

22. The optical film of claim 1 wherein the optical film has a reverse birefringence dispersion of D<0.9.

23. An LCD polarizer film composite comprising a polarizer and an optical film comprising a first component having a birefringence dispersion of D1>1 and a second component having a birefringence dispersion of D2<1, wherein the birefringence ratio of the first and second component is delta n1/delta n2>0, and wherein the optical film has a reverse birefringence dispersion.

24. A method of making an optical film comprising mixing a first component having a birefringence dispersion of D1>1 and a second component having a birefringence dispersion of D2<1 and forming a film from the resulting mixture, wherein the birefringence ratio of the first and second component is delta n1/delta n2>0, and wherein the optical film has a reverse birefringence dispersion.

25. The method of claim 24 a further comprising reacting the first component and the second component to form covalent bonds.

* * * * *